(12) United States Patent
Ruelle

(10) Patent No.: US 10,979,329 B2
(45) Date of Patent: Apr. 13, 2021

(54) METHOD AND DEVICE FOR MONITORING AT LEAST ONE ACTIVITY OF A CONNECTED OBJECT

(71) Applicant: STMicroelectronics (Grand Ouest) SAS, Delarue (FR)

(72) Inventor: Frederic Ruelle, Marigné-Laillé (FR)

(73) Assignee: STMicroelectronics (GRAND OUEST) SAS, Delarue (FR)

(*) Notice: Subject to any disclaimer, the term of this patent is extended or adjusted under 35 U.S.C. 154(b) by 14 days.

(21) Appl. No.: 16/183,091

(22) Filed: Nov. 7, 2018

(65) Prior Publication Data
US 2019/0140929 A1    May 9, 2019

(30) Foreign Application Priority Data
Nov. 8, 2017 (FR) .................................... 17 60484

(51) Int. Cl.
| | |
|---|---|
| *G06F 15/173* | (2006.01) |
| *H04L 12/26* | (2006.01) |
| *G06F 1/3209* | (2019.01) |
| *G08B 21/02* | (2006.01) |
| *G06N 20/00* | (2019.01) |

(Continued)

(52) U.S. Cl.
CPC ........ *H04L 43/0817* (2013.01); *G06F 1/3209* (2013.01); *G06F 1/3234* (2013.01); *G06F 21/552* (2013.01); *G06N 20/00* (2019.01); *G08B 1/08* (2013.01); *G08B 21/02* (2013.01); *H04L 63/145* (2013.01); *H04L 63/1425* (2013.01)

(58) Field of Classification Search
CPC .............. H04L 43/0817; H04L 63/145; H04L 63/1425; G06N 20/00; G06F 1/3209; G06F 1/3234; G06F 21/552; G06F 21/02; G08B 1/08
USPC ......................................................... 709/224
See application file for complete search history.

(56) References Cited

U.S. PATENT DOCUMENTS 5,504,801 A * 4/1996 Moser ...................... G06F 8/65
                                                                    379/27.01
5,832,263 A * 11/1998 Hansen ................. G06F 16/181
                                                                    719/322

(Continued)

FOREIGN PATENT DOCUMENTS

| CN | 102595411 A | 7/2012 |
|---|---|---|
| CN | 103445762 A | 12/2013 |
| CN | 107065754 A | 8/2017 |

*Primary Examiner* — Alicia Baturay
(74) *Attorney, Agent, or Firm* — Slater Matsil, LLP

(57) ABSTRACT

A method for monitoring an activity of a connected object including a monitoring device, includes: performing, by a measurement stage of the monitoring device, a first periodic measurement of an internal signal representative of an activity of the connected object; performing, by a computation stage of the monitoring device, a first non-cryptographic computation of an activity parameter representative of the activity from the internal signal measured during the first periodic measurement; comparing, by a comparison stage of the monitoring device, between the activity parameter on completion of the first non-cryptographic computation and a range of settings of corresponding to the activity parameter; and triggering, by a control stage of the monitoring device, a safety action in response to a determination that the activity parameter is outside of the range of settings.

20 Claims, 4 Drawing Sheets

(51) Int. Cl.
  *G08B 1/08*   (2006.01)
  *G06F 1/3234*  (2019.01)
  *G06F 21/55*  (2013.01)
  *H04L 29/06*  (2006.01)

(56) References Cited

U.S. PATENT DOCUMENTS

| | | | |
|---|---|---|---|
| 6,418,386 B1* | 7/2002 | Wong-Lam | G01R 13/34 |
| | | | 702/66 |
| 7,549,069 B2* | 6/2009 | Ishihara | G06F 30/33 |
| | | | 713/320 |
| 7,592,974 B2* | 9/2009 | Suzuki | G09G 3/2944 |
| | | | 345/60 |
| 9,489,284 B2* | 11/2016 | Ghica | G06F 11/3636 |
| 9,705,914 B2* | 7/2017 | Di Pietro | H04L 63/1458 |
| 10,037,212 B2* | 7/2018 | Porosanu | G06F 9/4482 |
| 10,070,390 B2* | 9/2018 | Patel | H04W 52/0245 |
| 10,178,110 B2* | 1/2019 | Kareti | H04L 63/1416 |
| 10,193,438 B2* | 1/2019 | Mohan | H02M 1/4208 |
| 10,374,869 B2* | 8/2019 | Jain | H04L 41/046 |
| 10,381,109 B2* | 8/2019 | Hong | A61B 5/112 |
| 10,667,727 B2* | 6/2020 | Mostafavi | G06K 9/0053 |
| 2013/0325388 A1 | 12/2013 | Joensuu | |
| 2015/0033294 A1* | 1/2015 | Fevrier | H04L 41/28 |
| | | | 726/4 |
| 2016/0028750 A1 | 1/2016 | Di Pietro et al. | |
| 2017/0235971 A1* | 8/2017 | Kline et al. | G16B 50/00 |
| | | | 713/193 |
| 2017/0318039 A1 | 11/2017 | Kareti | |
| 2018/0007074 A1* | 1/2018 | Kune | G06F 1/28 |
| 2019/0238574 A1* | 8/2019 | Iliofotou | H04L 63/1425 |
| 2019/0274560 A1* | 9/2019 | Zalevsky | A61B 5/02416 |

* cited by examiner

METHOD AND DEVICE FOR MONITORING AT LEAST ONE ACTIVITY OF A CONNECTED OBJECT

CROSS-REFERENCE TO RELATED APPLICATIONS

This application claims the benefit of French Application No. 1760484, filed on Nov. 8, 2017, which application is hereby incorporated herein by reference.

TECHNICAL FIELD

Implementations and embodiments of the invention relate to the Internet of Things, commonly known to the person skilled in the art by the acronym IoT, and in particular embodiments to a method and device for monitoring at least one activity of a connected object.

BACKGROUND

In recent years, connected objects are increasingly widely used in everyday life.

The connectivity to the Internet of a connected object advantageously allows a remote monitoring and control of the state of operation of the connected object.

Increasingly, new operations are developed for dedicated connected objects, which demands appropriate software modifications or firmware upgrades in these connected objects.

However, in addition to the possible existence of a security failing in the initial version of the connected objects, such a software modification or such an update via the Internet unfortunately increases the possibility of a modification of connected objects via malicious software, even the possibility of computer hacking, which could result in significant damage.

One conventional solution for resolving this security problem consists in the use of a complex mechanism based on cryptographic resources, for example a digital signature, so as to check the authorization of each intervention on the connected objects.

However, this mechanism demands a cryptographic control circuit and a processing unit of high computation power, which are generally too costly in particular for low cost connected objects.

There is thus a need to propose a technical solution with low complexity and low cost that makes it possible to monitor abnormal activities of a connected object without using a cryptographic control circuit so as to protect the connected object against modifications by malicious software or computer hacking.

SUMMARY

According to one aspect, a method is proposed for monitoring at least one activity of a connected object. This method includes a first periodic measurement of a least one internal signal representative of at least one activity of the connected object, a first non-cryptographic computation of at least one activity parameter representative of said at least one activity from said at least one measured internal signal, a comparison between each computed activity parameter on completion of the first computation and a range of settings of the corresponding parameter, and a triggering of at least one safety action if at least one computed activity parameter on completion of the first computation is found to be outside of said range of settings.

In practice, for a connected object intended to perform one or more monotonic and simple operations, to draw a characteristic profile independent of its operation but dependent on the use of its resources, for example on its power supply source or on its communication circuit, so as to create a range of acceptable profiles for determining whether the activity or activities of said connected object are or are not normal.

In other words, a difference is drawn here between the operation of the connected object and the monitoring of its activity.

The operation of the connected object is reflected in particular by the transmission of data which are specific to the operation of the object and its nature. Thus, a temperature sensor transmits in particular, in operation, temperature information whereas a pressure sensor in particular transmits pressure information.

By contrast, the monitoring of the activity of the connected object is independent of the type of object (e.g. temperature sensor, pressure sensor, etc.) and of the type of information transmitted relating to its operation (e.g. temperature values, pressure values, etc.), but deals with other parameters relating to the activity of the object (for example frequency of the data transmission bit rate, power consumption of the object, ranges transmitted, values aberrant, etc.) whatever the nature of the data transmitted (e.g. temperature, pressure, etc.).

Advantageously, such a method makes it possible to monitor activity parameter or parameters corresponding to the characteristic profile or profiles of the connected object. If this or these activity parameters are detected outside of the range or ranges of settings, in other words the acceptable profile ranges, the activities of the connected object can be considered to be abnormal and provision is made for at least one safety action to be triggered following this detection so as to protect the connected object.

It should be noted that the first computation uses no cryptographic resource and therefore does not require high computation power. It is advantageously possible to adjust the period of the first computation as a function of the frequency of activity of the connected object so as to further balance its performance and its energy/power consumption.

According to one implementation, each activity parameter includes a power consumption parameter and/or a data transmission parameter.

It should be noted that the power consumption parameter or the data transmission parameter of the connected object depends on the rate and the intensity of activities of the connected object but does not depend on its operation or operations.

As a non-limiting example, the power consumption parameter can be a parameter chosen from the group formed by the following parameters: average power consumption, average current and peak current value; and the data transmission parameter can be a parameter chosen from the group formed by the following parameters: size of packets, transmission bit rate and communication model.

According to one implementation, each safety action is chosen from the group formed by: a cutting of power supply to the connected object, a reset of default parameters, and a transmission of notification signals to a computer server via a communication link.

As an indication, the communication link can for example be based on a technology chosen from the group formed by the following technologies: Long Range Lowe Power (LoRa), SigFox, mobile telephony network, WiFi and Ethernet.

According to one implementation, the range of settings of each activity parameter can be predetermined, for example preconfigured by the manufacturer of the connected object.

According to another implementation, the range of settings of each activity parameter is intended to be updated in a learning phase.

This learning phase advantageously allows a user of the connected object to assist the connected object either in spontaneously refining the activity parameters, or in readapting the activity parameters to a possible upgrade of firmware contained in the connected object.

The learning phase can for example include a second periodic measurement, under authorization of a user of the connected object, of said at least one internal signal during a predetermined or user-configurable period, a second non-cryptographic computation of said at least one activity parameter from said at least one internal signal measured during said period, and an update of the range of settings of the corresponding activity parameter from each computed activity parameter on completion of the second computation.

According to another aspect, a connected object is proposed including a device for monitoring at least one activity of the connected object.

Said monitoring device includes a measurement stage configured to perform a first periodic measurement of at least one internal signal representative of said at least one activity of the connected object, a computation stage configured to perform a first non-cryptographic computation of at least one activity parameter from said at least one measured internal signal, a comparison circuit configured to compare each computed activity parameter and a range of settings of the corresponding activity parameter, and a control stage configured to trigger at least one safety action if at least one computed activity parameter is found to be outside of said range of settings.

According to one embodiment, each activity parameter includes a power consumption parameter and/or a data transmission parameter.

As a non-limiting indication, the power consumption parameter can be a parameter chosen from the group formed by the following parameters: average power consumption, average current and peak current value.

The transmission parameter can for example be a parameter chosen from the group formed by the following parameters: size of data packets transmitted, transmission bit rate and communication protocol.

According to one embodiment, each safety action is chosen from the group formed by: a cutting of power supply to the connected object, a reset of default parameters, and a transmission of notification signals to a computer server via a communication link.

The communication link can for example be based on a technology chosen from the group formed by the technologies: LoRa, SigFox, mobile telephony network, WiFi and Ethernet.

According to another embodiment, the connected object further includes a processing circuit configured to generate information resulting from the operation of the connected object and a communication circuit configured to transmit this information outside of the connected object over said communication link.

As indicated above, the functionality of the monitoring device is different from that of the processing circuit.

The monitoring device can for example be incorporated in software module form in a non-modifiable program memory of the processing circuit.

Such software is then advantageously protected.

According to a variant, the monitoring device is incorporated in a microcontroller, for example of STM8® type, marketed by the company STMicroelectronics, configured to receive at least a part of the information transmitted by the processing circuit for monitoring purposes. The microcontroller includes an execution program stored in a non-modifiable program memory and has no link with the communication circuit.

According to another variant, the monitoring device is coupled to the communication circuit so as to transmit the notification signals over said communication link.

According to one embodiment, the range of settings of each parameter is predetermined.

According to another embodiment, the monitoring device is configured to update the range of settings of each activity parameter in a learning phase.

As a non-limiting indication, in the learning phase, the measurement stage is configured to perform a second periodic measurement, under authorization of a user of the connected object, of said at least one internal signal during a predetermined or user-configurable period, the computation stage is configured to perform a second non-cryptographic computation of said at least one activity parameter from said at least one internal signal measured during said period, and the control stage is further configured to update the range of settings of the corresponding activity parameter from each computed activity parameter on completion of the second computation.

According to another aspect, a monitoring device is proposed that is incorporated in a connected object as defined above.

According to yet another object, an electronic system is proposed including one or more connected objects as defined above.

BRIEF DESCRIPTION OF THE DRAWINGS

Other advantages and features of the invention will become apparent on studying the detailed description of non-limiting implementations and embodiments, and the attached drawings in which.

DETAILED DESCRIPTION OF ILLUSTRATIVE EMBODIMENTS

Implementations and embodiments of the invention relate to the Internet of Things, commonly known to the person skilled in the art by the acronym IoT, and more particularly the objects connected to the Internet network in the broad sense, that is to say including for example the local area network (LAN), the wide area network (WAN), intended to mutually communicate computer data and to carry out practical and relatively simple operations, such as connected temperature sensors, connected door opening sensors and connected electrical switches.

Figure 1:
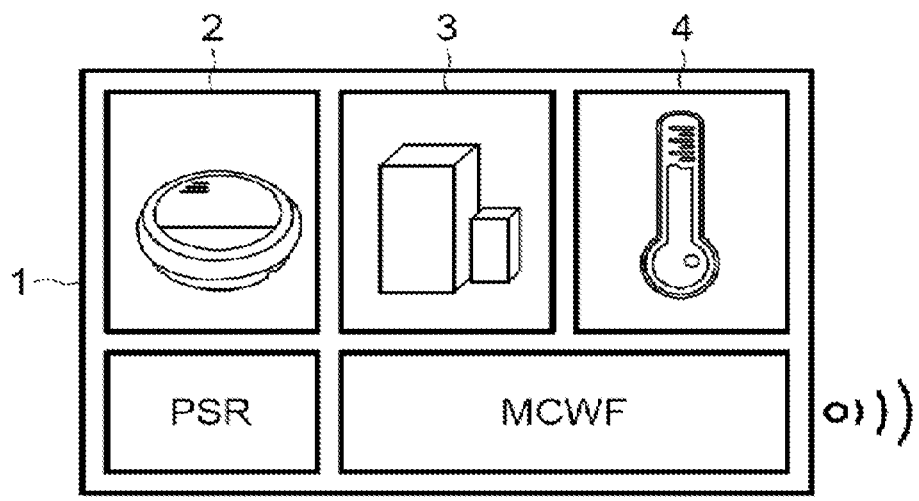
FIGS. 1 to 5 schematically illustrate implementations and embodiments of the invention.

The reference 1 in FIG. 1 designates an electronic system, here, for example, a set of connected objects known as "Internet of Things" (IoT) intended to ensure the home automation safety of a dwelling such as a home or an office.

This system 1 includes several so-called connected objects, here, for example a connected smoke sensor 2, a door opening sensor 3 and a temperature sensor 4.

This system 1 further includes a gateway PSR known to the person skilled in the art and intended to manage the sensors 2 to 4.

These sensors 2 to 4 are connected to the Internet, for example via a Wi-Fi communication circuit, MCWF, conforming to the IEEE 802.11 standards, incorporated in the system 1.

Because of this, the system 1 allows its user to remotely check, for example via a software application for smartphones, the state of operation of each sensor 2 to 4, to receive one or more warnings via the Internet in the presence of an abnormal value detected by one of the sensors 2 to 4, for example smoke detected in the ambient air in proximity to the connected smoke sensor 2, and to remotely control operations of each sensor 2 to 4.

It should be noted that the sensors 2 to 4 are intended here to perform relatively regular and simple operations. In other words, there is no need to have complex processing circuit or high computation power.

These sensors 2 to 4 are consequently designed to be manufactured at low cost and therefore include no costly cryptographic control circuit aiming to avoid non-authorized interventions.

Figure 2:
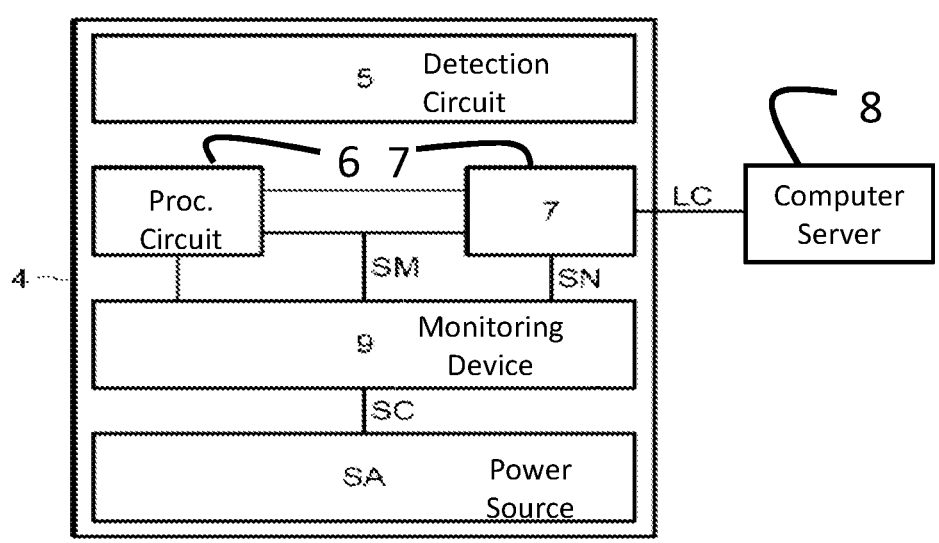

For simplification purposes and as a non-limiting example, reference is now made to FIG. 2 to illustrate an example of production of the temperature sensor 4.

The temperature sensor 4 includes detection circuit 5 configured to detect one or more temperatures in proximity to a temperature sensor 4, processing circuit 6 configured to receive the detected temperatures and to generate information resulting from the operation of the sensor 4, here temperature detection values and any warnings if these detection values exceed setting thresholds, communication circuit 7 configured to transmit these detection values to a computer server 8 via a communication link LC so as to allow one or more users of the sensor 4 to consult these detection values and receive any warnings, a monitoring device 9 configured to monitor activity parameters PA of the sensor 4 such as a transmitted data bit rate, a size of data packets transmitted, an average current, the peak value of a current, and an average power consumption, and a power supply source SA.

As indicated above, the operations performed by the temperature sensor 4, here to regularly sense the temperature in proximity to the temperature sensor 4, are relatively regular and simple and do not require costly cryptographic control.

Consequently, the activity parameters PA of the sensor 4 which do not depend on these operations themselves but depend on activities of the sensor 4 to perform these operations are also supposed to be regular and stable when the sensor 4 is in its normal state.

In other words, if the temperature sensor 4 operates normally, the activity parameters PA, here for example the average power consumption and the data transmission bit rate of the sensor 4, are normally always within predictable ranges of values that can be predetermined, for example in the manufacturing of the sensor 4.

When the sensor 4 is subjected to computer hacking or is modified via malicious software, such malicious activity may manifest itself as modification of the activity parameters PA so as to be outside of predictable ranges of values, or ranges of settings.

For example, the average power consumption of such a hacked sensor 4 and its data transmission bit rate will be increased for at least a certain time following such a computer hacking.

Because of this, it is possible to monitor the correct operation of the temperature sensor 4 via regular tracking of these activity parameters PA.

It should be noted that FIG. 2 illustrates, in effect, an example of production of the temperature sensor 4 in which the monitoring device 9 is physically coupled (e.g. within the sensor 4) to the processing circuit 6, to the communication circuit 7 and to the power source SA.

The monitoring device 9 is configured to receive a temperature measurement signal SM delivered by the processing circuit 6 and a current signal SC delivered by the power source SA.

More particularly, according to this embodiment, the monitoring device 9 is intended to transmit to the computer server 8 one or more notification signals SN via the communication circuit 7 and the communication link LC when the activity or activities of the sensor 4 are considered to be abnormal by the monitoring device 9.

As a non-limiting indication, the communication link LC is based on a technology chosen form the group formed by the following technologies: LoRa, SigFox, mobile telephone network, WiFi and Ethernet.

The computer server 8 can be located locally in the system 1 (not illustrated in FIG. 2) or, advantageously, remotely on a "Cloud".

When the computer server 8 receives the notification signal or signals SN, the computer server 8 is configured to send a warning to the default user of the system 1 and to ask the user for authorization to cut the power supply to the sensor 4 or to upgrade firmware contained in the sensor 4.

Figure 3:
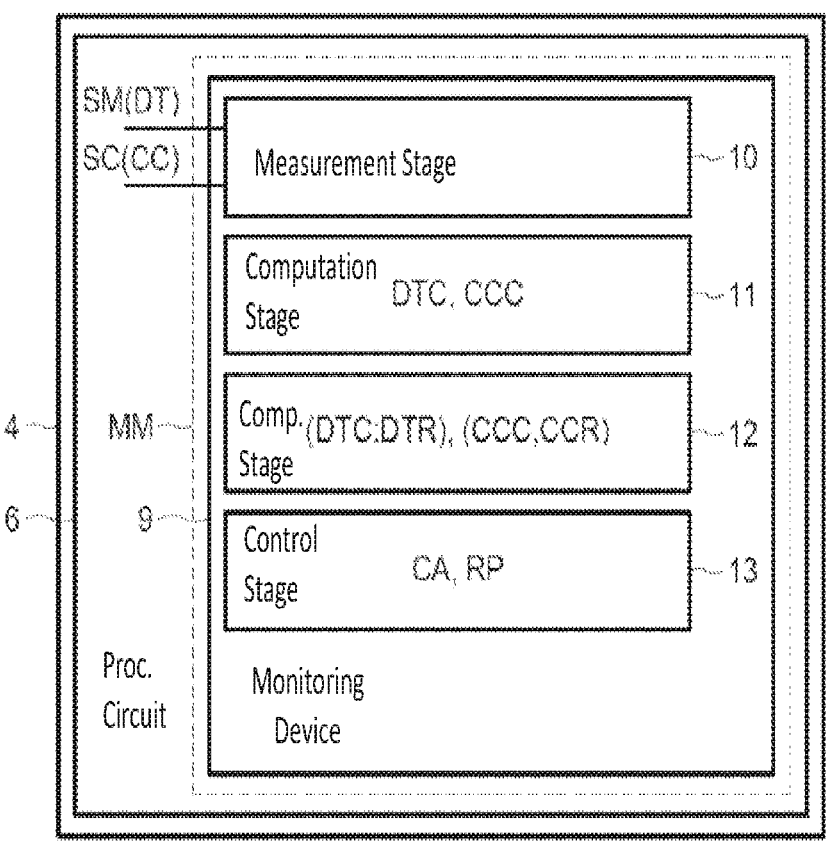

Reference is now made to FIG. 3 to schematically illustrate another example of production of the monitoring device 9 and its internal structure.

In this variant, the monitoring device 9 is implemented in the form of a software module incorporated in the processing circuit 6, here for example a microcontroller of STM32® type marketed by the company STMicroelectronics.

In order to ensure that the monitoring device 9 is not modified, for example by malicious software, it is recommended to isolate this monitoring device 9.

In this respect, it is preferable to implement the software module in a non-modifiable medium, for example a non-modifiable flash memory MM.

The monitoring device 9 here includes a measurement stage or circuit 10, a computation stage or circuit 11, a comparison stage or circuit 12 and a control stage or circuit 13.

As an indication but in a non-limiting manner, the activity parameters PA to be monitored by the monitoring device 9 include power consumption parameters PC such as the average power consumption, the average current and the peak current value; and transmission parameters PT such as the size of packets transmitted, the transmission bit rate and the communication protocol.

The measurement stage 10 is configured to perform a first periodic measurement of at least one internal signal representative of at least one activity of the sensor 4, here for example the measurement signal SM representative of the data transmission bit rate DT and the current signal SC of the power source SA representative of the peak current value CC.

It should be noted that these activity parameters DT and SA are drawn from the technical characteristics of the measurement signal SM and of the current signal SC but not from information contained in the measurement signal SM and the current signal SC.

Based on the technical characteristics of the sensor 4, it is possible to predetermine a range of settings of the transmission bit rate DTR, for example <100 MB/s, and a range of settings of the peak current value CCR, for example <200 mA.

In order to minimize its influence on the performance of the sensor 4, the first measurement can for example be performed every 8 hours.

The computation stage 11 is coupled to the measurement stage 10 and configured to perform a first non-cryptographic computation from the measurement signal SM and the current signal SC so as to obtain the computed transmission bit rate DTC and the computed peak current value CCC.

Advantageously, a high computation power for performing the first non-cryptographic computation is not necessary which therefore has little influence on the performance of the sensor 4.

The comparison stage 12 is configured to compare the computed activity parameters DTC and CCC and the ranges of settings of the corresponding activity parameters DTR and CCR.

If the computed activity parameters DTC and CCC are found respectively to be in their range of settings that indicates that the sensor 4 is operating in its normal state and that there is no abnormal activity to be signaled.

Otherwise, the activity of the sensor 4 is different in relation to its normal state and the sensor 4 has potentially undergone a computer hacking.

Consequently, the control stage 13 is configured to trigger at least one safety action, here for example a cutting of the power supply CA to the sensor 4 and a reset of default parameters RP so as to avoid other more significant damage.

It should be noted that these safety actions CA and RP are also provided in the embodiment of the monitoring device 9 illustrated in FIG. 2.

Figure 4:
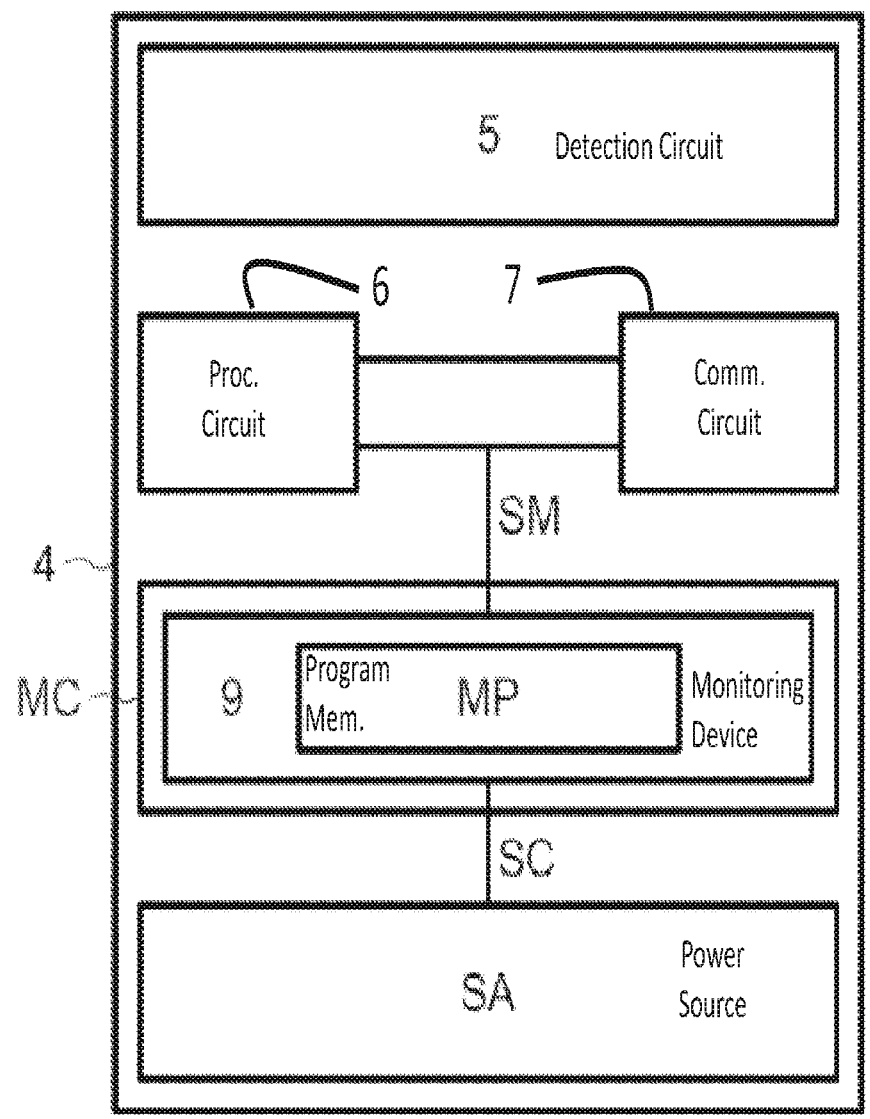

According to a preferred embodiment illustrated in FIG. 4, the monitoring device 9 is incorporated in a microcontroller MC, for example of the type STM8® marketed by the company STMicroelectronics, receiving the measurement signal SM and the current signal SC.

The monitoring device 9 here includes an execution program stored in a non-modifiable program memory MP and has no physical or communicative link with the communication circuit 7.

In other words, the monitoring device 9 and its program memory MP are protected against any modifications via malicious software or computer hacking and are not modifiable via the processing circuit 6 or the communication circuit 7.

In this embodiment, the safety actions provided by the monitoring device 9 include the cutting of power supply CA to the sensor 4 and the resetting of parameters RP but not the transmission of notification signals SN.

As mentioned before, the embodiment of the monitoring device 9 illustrated in FIG. 2 possibly provides an update of firmware contained in the sensor 4.

Figure 5:
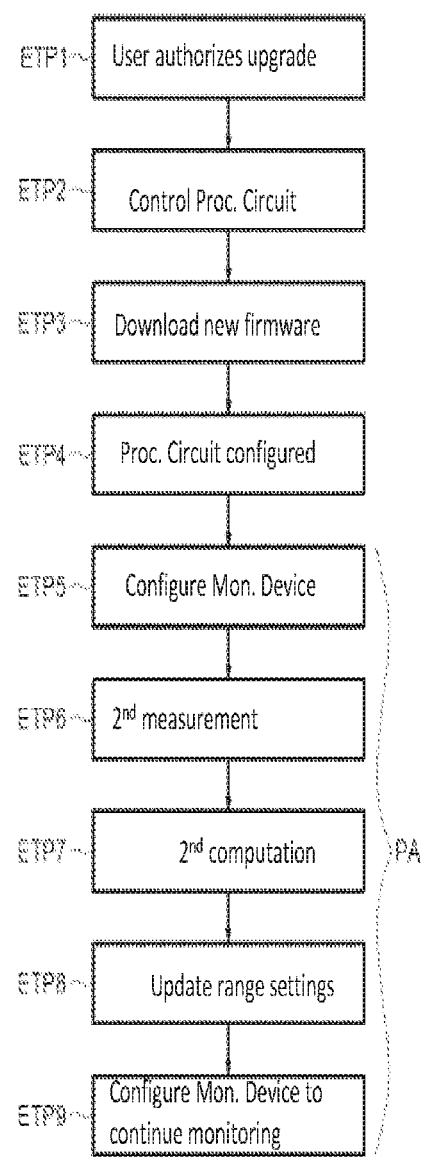

Reference is now made to FIG. 5 to schematically illustrate an example of implementation of such an upgrading of the firmware.

If the user authorizes said upgrade in step ETP1, the computer server 8 is configured to control the processing circuit 6 so as to download a new version of the firmware in step ETP2 via the communication circuit 7.

Once the new version of the firmware is downloaded in step ETP3, the processing circuit 6 is configured to perform the upgrading of the firmware in step ETP4 with this latest version of the firmware.

Since the new version of the firmware possibly provides new operations and new configurations of the sensor 4, the monitoring device 9 is further configured to start an update in step ETP5 of the ranges of settings of each activity parameter DTR and CCR in a learning phase PA following said upgrading of the firmware.

It should be noted that the user of the sensor 4 can also launch the learning phase PA without an upgrading of the firmware so as to assist the sensor 4 in spontaneously refining its activity parameters DT, SA.

During this learning phase PA, the measurement stage 10 is configured to perform a second periodic measurement in step ETP6, under authorization of the user of the sensor 4, of the measurement signal SM representative of the transmission bit rate DT and of the current signal SC of the power source SA representative of the peak current value CC.

This second measurement in step ETP6 has, for example, a same periodicity as that of the first measurement, and the duration of this second measurement in step ETP6 can be predetermined, for example equal to 24 hours, or configurable by the user of the sensor 4, in other words the user can place a term on the second measurement when he or she wants.

The computation stage 11 is further configured to perform, during said period of the second measurement, a second non-cryptographic computation in step ETP7 from the measurement signal SM and the current signal SC so as to obtain a new computed transmission bit rate NDTC and a new computed peak current value NCCC.

The control stage 13 is further configured to update in step ETP8 the ranges of settings of each parameter DTR and CCR from the new computed transmission bit rate NDTC and from the new computed peak current value NCCC.

The monitoring device 9 is configured to continue the monitoring of at least one activity in step ETP9 of the sensor 4 with said updated ranges of settings.

It should be noted that this learning phase is not necessary for connected objects which do not need upgrading for security reasons, such as connected pacemakers and connected insulin pumps.

Thus, a device for monitoring at least one activity of a connected object is obtained that offers a low cost and low complexity security mechanism.

This security mechanism advantageously allows a physical and/or communicative division between this monitoring device and processing and communication circuits of the connected object so as to reinforce the security (e.g. rendering the monitoring device non-modifiable via the processing and/or communication circuits), and a learning mode adapted to any upgrading of the firmware of the connected object.

What is claimed is:

1. A method for monitoring an activity of a connected object comprising a monitoring device, the method comprising:
    having the monitoring device incorporated in a software module in a non-modifiable memory of a processing circuit;
    performing, by a measurement stage of the monitoring device, a first periodic measurement of an internal signal representative of an activity of the connected object;

performing, by a computation stage of the monitoring device, a first non-cryptographic computation of an activity parameter representative of the activity from the internal signal measured during the first periodic measurement;

comparing, by a comparison stage of the monitoring device, between the activity parameter on completion of the first non-cryptographic computation and a range of settings of corresponding to the activity parameter; and triggering, by a control stage of the monitoring device, a safety action in response to a determination that the activity parameter is outside of the range of settings.

2. The method according to claim 1, wherein the activity parameter comprises a power consumption parameter or a data transmission parameter.

3. The method according to claim 2, wherein the power consumption parameter comprises at least one of an average power consumption of the connected object, an average current of the connected object, and a current peak value of the connected object, and wherein the data transmission parameter comprises at least one of a size of data packets transmitted by the connected object, a transmission bit rate of the connected object, and a communication protocol executed by the connected object.

4. The method according to claim 1, wherein the safety action comprises at least one of a cutting of a power supply of the connected object, a reset of default parameters of the connected object, and a transmission of a notification signal to a computer server communicatively coupled to the connected object via a communication link.

5. The method according to claim 4, wherein the communication link is based on a technology chosen from at least one of LoRa, SigFox, mobile telephony network, Wi-Fi and Ethernet.

6. The method according to claim 1, wherein the range of settings of the activity parameter is predetermined, static during operation of the connected object, or both predetermined and static during operation of the connected object.

7. The method according to claim 6, wherein the range of settings of the activity parameter is updated during operation of the connected object in a learning phase.

8. The method according to claim 7, wherein the learning phase comprises
  a second periodic measurement, by the measurement stage of the connected object and under authorization of a user of the connected object, of the internal signal during a predetermined period or a user-configurable period;
  a second non-cryptographic computation, by the computation stage of the connected object, of the activity parameter from the internal signal measured during the predetermined period or the user-configurable period; and
  updating the range of settings corresponding to the activity parameter from the activity parameter on completion of the second non-cryptographic computation.

9. The method of claim 1 wherein the processing circuit is configured to generate information resulting from an operation of the connected object and a communication circuit configured to transmit the information outside of the connected object over a communication link.

10. A connected object comprising:
  a processing circuit configured to execute a program stored in a non-modifiable memory to:
    perform a first periodic measurement of an internal signal representative of an activity of the connected object;
    perform a first non-cryptographic computation of an activity parameter from the internal signal measured during the first periodic measurement;
    compare the activity parameter and a range of settings corresponding to the activity parameter; and
    trigger a safety action in response to the activity parameter being outside of the range of settings.

11. The connected object according to claim 10, wherein the activity parameter comprises a power consumption parameter or a data transmission parameter.

12. The connected object according to claim 11, wherein the power consumption parameter comprises at least one of an average power consumption of the connected object, an average current consumed by the connected object, and a peak current value of the connected object, and wherein the data transmission parameter comprises at least one of a size of data packets transmitted by the connected object, a transmission bit rate of the connected object, and a communication protocol executed by the connected object.

13. The connected object according to claim 10, wherein the safety action comprises at least one of a cutting of power supply to the connected object, a reset of default parameters of the connected object, and a transmission of a notification signal to a computer server communicatively coupled to the connected object by a communication link.

14. The connected object according to claim 13, wherein the communication link is based on a technology chosen from at least one of LoRa, SigFox, mobile telephony network, WiFi and Ethernet.

15. The connected object according to claim 13, wherein the processing circuit is configured to generate information resulting from an operation of the connected object and a communication circuit configured to transmit the information outside of the connected object over the communication link.

16. The connected object according to claim 15, wherein the processing circuit is coupled to the communication circuit so as to transmit the notification signal over the communication link.

17. The connected object according to claim 10, wherein the range of settings of the activity parameter is predetermined, static during operation of the connected object, or predetermined and static during operation of the connected object.

18. The connected object according to claim 17, wherein the processing circuit is configured to execute the program stored in the non-modifiable memory to update the range of settings of the activity parameter during operation of the connected object in a learning phase.

19. The connected object according to claim 18, wherein, in the learning phase the processing circuit executes the program to:
  perform a second periodic measurement, under authorization of a user of the connected object, of the internal signal during a predetermined period or a user-configurable period;
  perform a second non-cryptographic computation of the activity parameter from the internal signal measured during the predetermined period or the user-configurable period; and
  update the range of settings corresponding to the activity parameter from the activity parameter on completion of the second non-cryptographic computation.

20. A method for monitoring an activity of a connected object comprising a monitoring device, the method comprising:
- having the monitoring device incorporated in a software module in a non-modifiable memory of a processing circuit;
- performing, by a measurement stage of the monitoring device, a first periodic measurement of an internal signal representative of an activity of the connected object;
- performing, by a computation stage of the monitoring device, a first non-cryptographic computation of an activity parameter representative of the activity from the internal signal measured during the first periodic measurement, the activity parameter comprising a power consumption parameter and a data transmission parameter;
- comparing, by a comparison stage of the monitoring device, between the activity parameter on completion of the first non-cryptographic computation and a range of settings of corresponding to the activity parameter; and
- triggering, by a control stage of the monitoring device, a safety action in response to a determination that the activity parameter is outside of the range of settings.

* * * * *